(12) United States Patent
Sellen et al.

(10) Patent No.: US 10,795,450 B2
(45) Date of Patent: Oct. 6, 2020

(54) HOVER INTERACTION USING ORIENTATION SENSING

(71) Applicant: Microsoft Technology Licensing, LLC, Redmond, WA (US)

(72) Inventors: Abigail Jane Sellen, Cambridge (GB); William A. S. Buxton, Toronto (CA); Samuel Gavin Smyth, Huntingdon (GB); Kenton O'Hara, Bristol (GB); Richard Malcolm Banks, Egham (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 15/405,298

(22) Filed: Jan. 12, 2017

(65) Prior Publication Data

US 2018/0196524 A1    Jul. 12, 2018

(51) Int. Cl.
| | | |
|---|---|---|
| G06F 17/00 | (2019.01) | |
| G06F 3/01 | (2006.01) | |
| G06F 3/0346 | (2013.01) | |
| G06F 3/0482 | (2013.01) | |
| G06F 1/16 | (2006.01) | |
| G06F 3/0488 | (2013.01) | |
| G06F 3/0487 | (2013.01) | |

(52) U.S. Cl.
CPC ............ *G06F 3/017* (2013.01); *G06F 1/1694* (2013.01); *G06F 3/0346* (2013.01); *G06F 3/0482* (2013.01); *G06F 3/0487* (2013.01); *G06F 3/0488* (2013.01); *G06F 2200/1637* (2013.01)

(58) Field of Classification Search
CPC ..................................................... G06F 1/1694
See application file for complete search history.

(56) References Cited

U.S. PATENT DOCUMENTS

| | | | |
|---|---|---|---|
| 8,255,836 | B1 | 8/2012 | Gildfind |
| 8,654,076 | B2 | 2/2014 | Ronkainen |
| 8,665,238 | B1 | 3/2014 | Gossweile et al. |
| 9,158,454 | B2 | 10/2015 | Westerman et al. |

(Continued)

FOREIGN PATENT DOCUMENTS

| | | |
|---|---|---|
| EP | 2437147 A1 | 4/2012 |
| WO | 2008085418 A2 | 7/2008 |

(Continued)

OTHER PUBLICATIONS

"International Search Report and Written Opinion Issued in PCT Application No. PCT/US2017/067154", dated Mar. 14, 2018, 12 Pages.

(Continued)

*Primary Examiner* — Mustafa A Amin

(57) ABSTRACT

An electronic device with a hover sensor is described where the electronic device has an orientation sensor configured to detect an orientation of the electronic device. The electronic device has a hover pattern recognition component configured to use data sensed by the hover sensor to recognize a hover pattern of one or more objects in a hover space extending from the hover sensor. The electronic device has a processor configured to select an action from a plurality of possible actions in dependence on the sensed orientation and the recognized hover pattern and to trigger the selected action.

20 Claims, 7 Drawing Sheets

(56) References Cited

U.S. PATENT DOCUMENTS

| | | | |
|---|---|---|---|
| 9,223,436 B2 | 12/2015 | Land et al. | |
| 9,236,860 B2 | 1/2016 | Unterreitmayer et al. | |
| 9,268,431 B2 | 2/2016 | King et al. | |
| 2011/0017644 A1* | 1/2011 | Valerio | B03B 9/061 209/38 |
| 2011/0148752 A1 | 6/2011 | Alameh et al. | |
| 2012/0050211 A1* | 3/2012 | King | G06F 3/0416 345/174 |
| 2012/0131416 A1* | 5/2012 | Dugan | G06F 11/32 714/760 |
| 2013/0104083 A1 | 4/2013 | Mlyniec et al. | |
| 2013/0222266 A1 | 8/2013 | Gardenfors et al. | |
| 2013/0316686 A1* | 11/2013 | Subbaramoo | H04W 8/22 455/418 |
| 2014/0078318 A1* | 3/2014 | Alameh | G06F 3/0304 348/207.99 |
| 2014/0267130 A1 | 9/2014 | Hwang et al. | |
| 2015/0177840 A1* | 6/2015 | Kankaanpaa | G06F 3/017 715/863 |
| 2015/0177866 A1* | 6/2015 | Hwang | G06F 3/0488 345/175 |
| 2015/0205400 A1 | 7/2015 | Hwang et al. | |
| 2015/0234468 A1* | 8/2015 | Hwang | G06F 3/017 345/156 |
| 2016/0209928 A1* | 7/2016 | Kandur Raja | G06F 3/017 |

FOREIGN PATENT DOCUMENTS

| | | |
|---|---|---|
| WO | 2015105815 A1 | 7/2015 |
| WO | 2015126681 A1 | 8/2015 |

OTHER PUBLICATIONS

Arya, Aayush, "Make Your Android Device a Whole Lot Smarter with these Handy Android Apps", http://thenextweb.com/apps/2014/01/11/make-your-android-device-smarter-with-these-handy-apps/, Published on: Jan. 11, 2014, 12 pages.

* cited by examiner

HOVER INTERACTION USING ORIENTATION SENSING

BACKGROUND

There is an ongoing need to improve the manner in which end users are able to control electronic devices such as smart phones, wearable computers and tablet computers. The burden on end users of producing user input for such electronic devices can be significant, especially where the computing device has a small form factor.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

An electronic device with a hover sensor is described where the electronic device has an orientation sensor configured to detect an orientation of the electronic device. The electronic device has a hover pattern recognition component configured to use data sensed by the hover sensor to recognize a hover pattern of one or more objects in a hover space extending from the hover sensor. The electronic device has a processor configured to select an action from a plurality of possible actions in dependence on the sensed orientation and the recognized hover pattern and to trigger the selected action.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
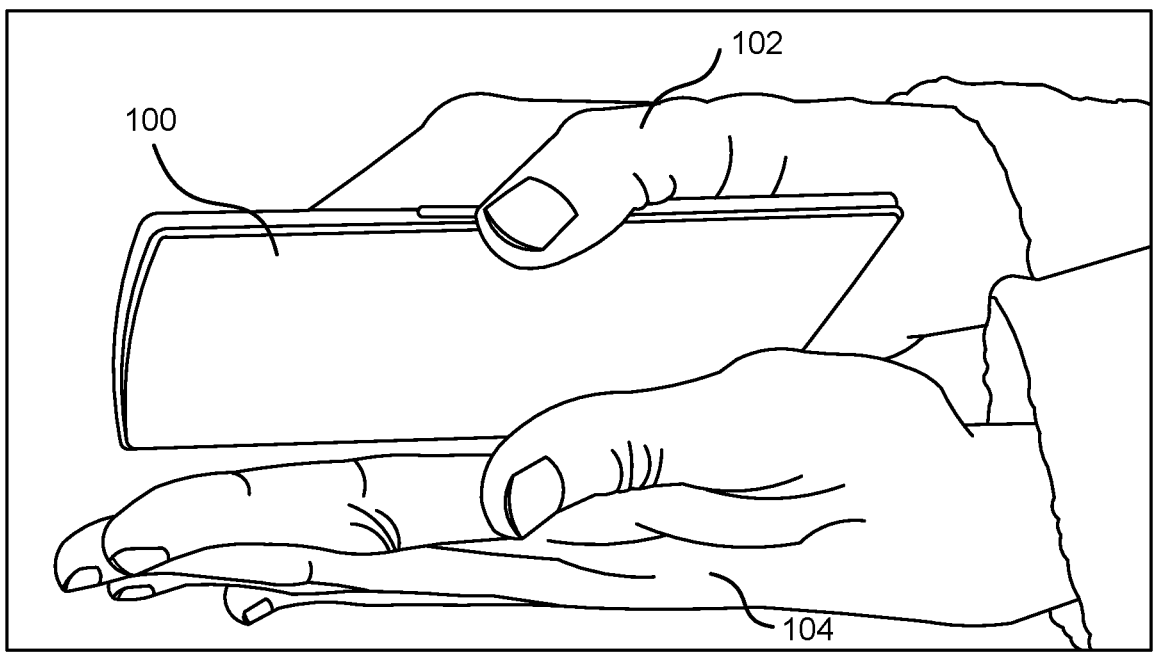
FIG. 1 is a schematic diagram of a user making a hover interaction with her smart phone in a first orientation.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

Although the present examples are described and illustrated herein as being implemented in a smart phone, the system described is provided as an example and not a limitation. As those skilled in the art will appreciate, the present examples are suitable for application in a variety of different types of electronic devices which have hover sensitive displays, such as tablet computers, wearable computers including but not limited to smart watches, and other electronic devices.

A hover sensor is a mechanism for detecting an entity in a hover volume over, and optionally touching, the hover sensor. In some cases the hover sensor gives a single bit value indicating whether or not an entity is present in the hover volume. In some cases the hover sensor gives a z value indicating a distance of an entity in the hover volume from the hover sensor. In some cases the hover sensor gives x, y, z coordinates of an entity in the hover volume. The entity may extend over more than one data point.

In some cases the hover sensor is a hover sensitive display although this is not essential. A hover sensitive display is a display screen which is able to detect x, y, z coordinates of an entity in a hover volume over, and optionally touching, the display screen. The x and y coordinates are in the plane of the display screen whereas the z axis is perpendicular to the display screen and can be thought of as a distance from the display screen in the case of a hover sensitive display, or distance from the sensor in the case of a hover sensor. In various examples the hover sensor is operable to detect distances in the range of zero to around five inches from the hover sensor. Various different hover sensing technologies may be used to implement the hover sensor or hover sensitive display as described in more detail below. In some examples the hover sensor is a hover sensitive display and the hover sensor also extends around side faces of a smart phone or other electronic device incorporating the hover sensitive display.

Where an electronic device has a hover sensor, this can be used to enable a user to make hover interactions with the electronic device. A hover interaction occurs when one or more objects enters the hover volume and causes a hover pattern to be sensed by the hover sensor and trigger an action at the electronic device or at another entity associated with the electronic device, such as a remote server, a paired electronic device or other entity. A hover pattern is a two dimensional pattern of activation levels of a plurality of sensors of the hover sensor, or a chronological sequence of two dimensional hover patterns. Thus a hover interaction may be generated by a static object in the hover volume, or a moving or deforming object in the hover volume.

The resolution of a hover sensor (on the x, y axes) is limited, for example, by the number of sensor elements incorporated in the hover sensor. The resolution of a hover sensor is also limited on the z axis by the type of hover sensing technology used. Thus the number of hover interactions which can be accurately and robustly discriminated by hover sensitive technology is also limited. For example, where hover interactions are performed by a user's hand there are a limited number of these interactions that a user is able to perform from memory and which give hover patterns which are distinguishable from one another.

The technology described herein enables end users to better control electronic devices through use of hover interactions by taking into account orientation of the electronic device. The number of hover interactions that a user can perform is extended by taking into account the orientation of the electronic device. For example, the same hover pattern may trigger a different action in response to whether an electronic device is positioned face down or face up. For example, face up is where a display of the electronic device, which is supported by a housing of the electronic device, is uppermost with respect to the housing. In this way, even though the number of hover patterns which can be discriminated between at a hover sensor may be limited, the degree of control of the electronic device through hover patterns is increased by taking into account combinations of orientation and hover pattern.

FIG. 1 is a schematic diagram of a user making a hover interaction with her smart phone 100 in a first orientation in which the smart phone is generally horizontal and face down. In this example the hover senor is a hover sensitive display supported by a housing of the smart phone 100. A face down orientation of an electronic device is one in which a display of the electronic device is facing down with respect to a housing holding or supporting the display, and the electronic device is generally horizontal. The user's right hand is holding the smart phone and her right thumb 102 is gripping the edge of the smart phone. The user's left hand 104 is held generally horizontally with the palm facing the display screen and with the fingers outstretched. The user's left hand is about 2 to 10 cm away from the display screen of the electronic device.

Figure 11:
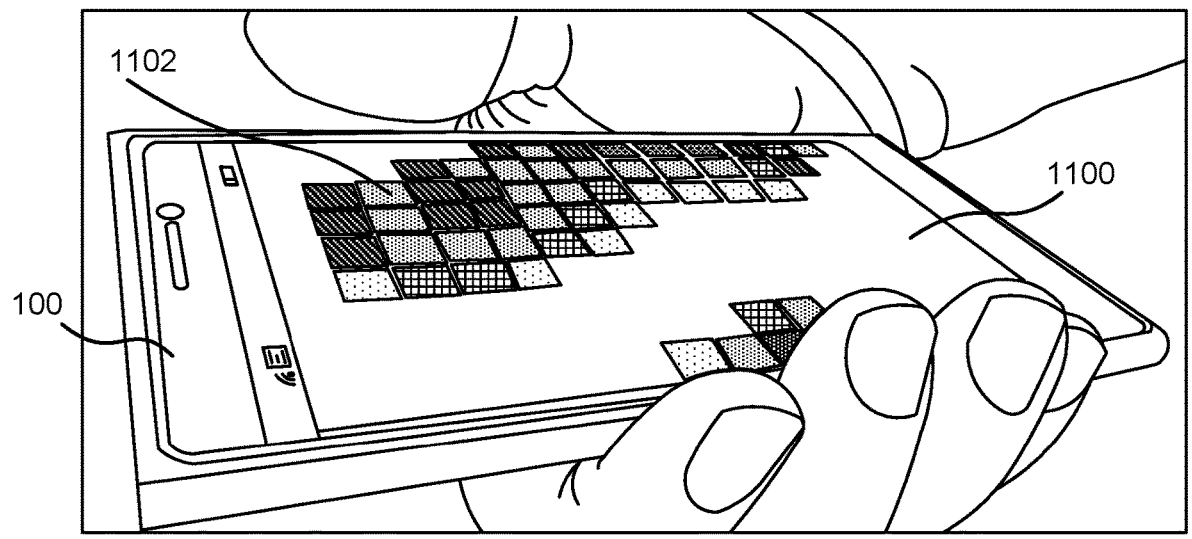
FIG. 11 is a schematic diagram of a hover sensitive display showing sensing regions of the hover sensitive display.

The hover sensitive display comprises a plurality of sensing regions referred to herein as pixels. In some examples the pixels tessellate over the surface of the display (as indicated in FIG. 11) and in some examples form a grid such as a grid of 16 by 9 sensing regions. However, it is not essential for the sensing regions to tessellate as there may be sensing regions at different, non-contiguous parts of the display.

Figure 2:
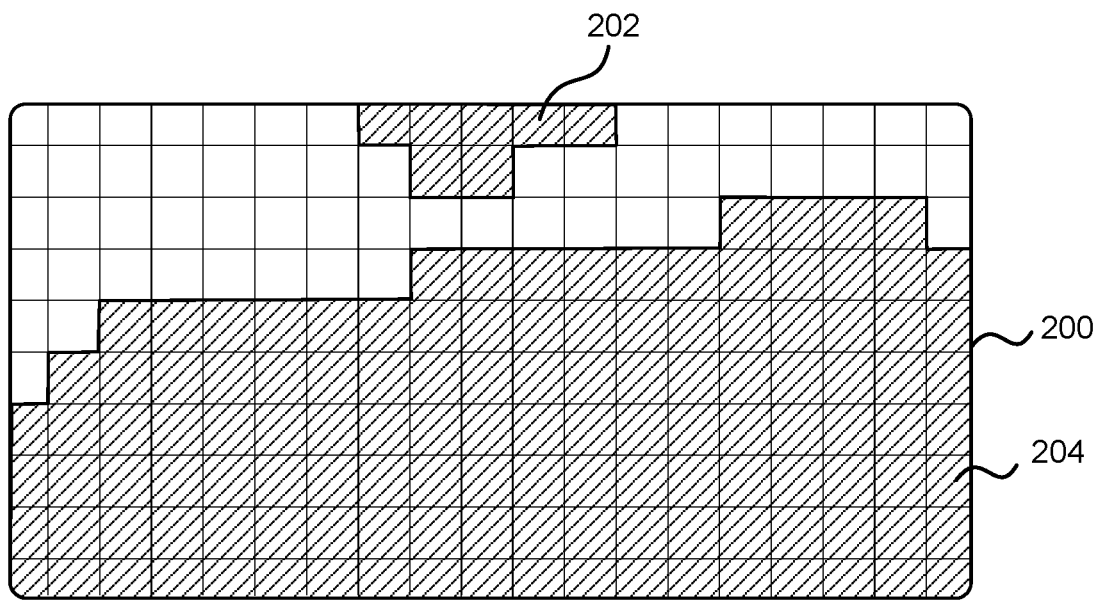
FIG. 2 is a schematic diagram of a hover pattern sensed at a hover sensitive display of the smart phone of FIG. 1.

FIG. 2 shows a two dimensional hover pattern sensed by the hover sensitive display of smart phone 100 in the scenario of FIG. 1. The rectangle 200 represents the area of the hover sensitive display which has a grid of 16×9 sensing regions in this example. The cells of the grid which are white represent sensing regions which are not activated. The cells of the grid which are cross hatched represent sensing regions which are activated. In some examples the amount of activation increases as an object moves closer to the display screen within the hover volume.

The smart phone has access to functionality for analyzing the hover pattern to recognize hover patterns. Recognizing hover patterns is done in any suitable way, for example, by matching the hover pattern to a plurality of template hover patterns and identify a best match. In this way the smart phone is able to recognize the hover pattern where a match is found with one of the templates. The hover patterns and hover pattern templates may be chronological sequences or patterns at particular time instances as mentioned above. Other methods of hover pattern recognition may be used.

The smart phone also has at least one orientation sensor which is not visible in FIG. 1 since it is within or integral with the housing of the smart phone 100. Any suitable type of orientation sensor is used such as one or more accelerometers, a gyroscope, a global positioning system sensor, or other orientation sensor. In the example of FIG. 1 the orientation sensor detects that the smart phone is face down and is generally horizontal. In some examples, the smart phone has a motion detector. The motion detector may be integral with the orientation sensor such as where the orientation sensor is a triple axis accelerometer. In the example of FIG. 1, and where the user moves the phone 100 by making an action as if to pour content from the phone 100 into the hand 104, or by shaking the phone, the motion detector detects the motion of the phone 100.

The smart phone triggers an action in dependence on both the sensed orientation and the recognized hover pattern. In some cases the action is triggered in dependence on the sensed orientation, the sensed motion, and the recognized hover pattern. For example, the action is to send content from the smart phone to a pre-specified location. In another example the action is to change a volume of the smart phone loudspeakers. Other examples of actions which may be triggered are given later in this document.

Figure 3:
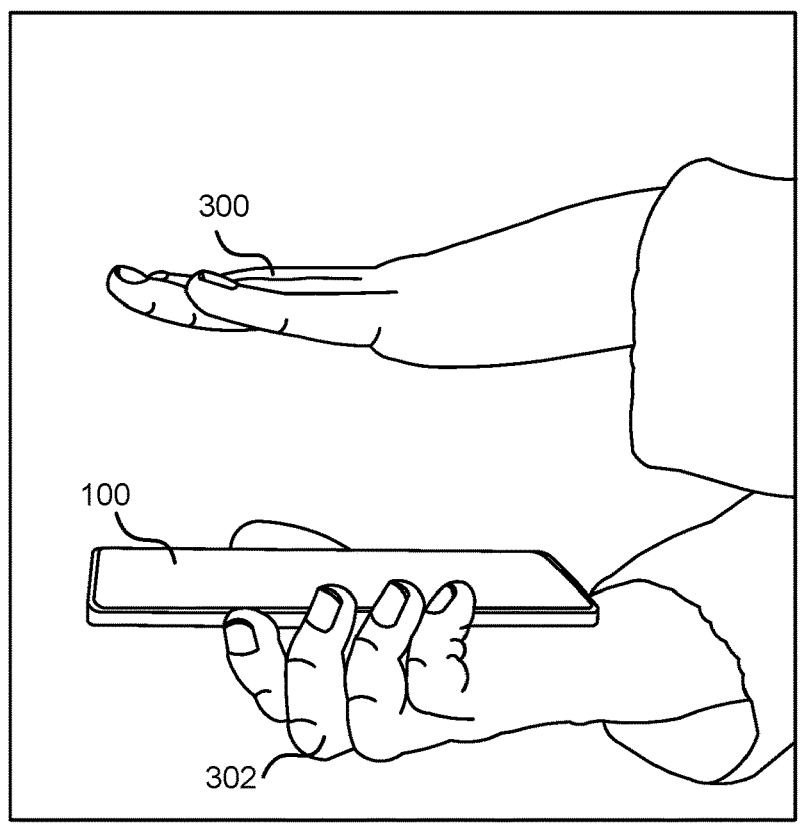
FIG. 3 is a schematic diagram of a user making the same hover interaction as in FIG. 1 and with her smart phone in a second orientation.

As mentioned above, the technology described herein enables the range of hover interactions that control the electronic device to be extended. In the example of FIG. 3 the smart phone 100 is generally rectangular and is oriented face up with its longitudinal axis being generally horizontal. In the example of FIG. 3 the hover sensor is a hover sensitive display. The phrase "oriented face up" means that the hover sensitive display is uppermost. The user is holding the smart phone 100 in his or her right hand 302 and is holding his or her left hand 300 in a generally horizontal position with fingers outstretched and palm facing downwards. The user's left hand 300 is in the hover volume of the smart phone 100 and is sensed by the hover sensitive display. The two dimensional hover pattern generated at the hover sensitive display is represented schematically in FIG. 4 and is generally the same as the hover pattern of FIG. 2. Where the user moves his or her hand along the z axis towards and away from the electronic device, a three dimensional hover pattern is generated which is also similar to the three dimensional hover pattern of FIG. 1 in the case the user's hand moves in the z axis towards and away from the electronic device.

The smart phone triggers an action in dependence on the sensed orientation (in this case the sensed orientation indicates that the display screen is face up) and also in dependence on the hover pattern. In some cases, where a motion detector at the smart phone detects motion of the smart phone, the detected motion is also used to trigger an action. Functionality at the smart phone or at an entity in communication with the smart phone (such as a cloud service, a home server, a paired electronic device which is physically proximate to the smart phone or other entity) selects an action from a plurality of actions according to the detected orientation and the recognized hover pattern (and optionally also detected motion). Because the detected orientation in the FIG. 3 scenario is different from that of the scenario of FIG. 1 the action selected is different from the action selected in the scenario of FIG. 1 (even though the hover patterns are very similar or the same, or cannot be reliably distinguished from one another). The functionality at the smart phone or other entity then triggers the selected action. In this way the range of hover interactions supported by the electronic device is increased.

In an example the hover sensor is used to facilitate transfer of content associated with the electronic device. For example, the content comprises content which has been created at the electronic device such as digital images captured with a camera at the electronic device, documents authored at the electronic device, chat messages created at the electronic device, and other content. In other examples the content comprises content which has been created at a remote entity such as a cloud service used by a user of the electronic device, or which has been created using another electronic device known to be associated with the user. The content to be transferred is marked or selected as a result of user input and/or using rules. In the case that rules are used an example rule is that any content created that day, or in a specified time period, and which is associated with the electronic device is marked for transfer.

The user makes a specified hover interaction such as that indicated in FIG. 1 and FIG. 2, or a three dimensional version of that hover interaction in which the user's hand 104 repeatedly moves in the z direction away from and towards the hover sensitive display screen. The resulting three dimensional hover pattern is recognized and the orientation of the smart phone 100 is detected. Motion of the smart phone is optionally also detected. Functionality at the smart phone 100 or at another entity selects an action from a plurality of possible actions in dependence on the detected orientation and the recognized hover pattern and optionally in dependence on the detected motion. In this example the selected action is to transfer the marked content. The electronic device triggers the selected action, for example, by sending the marked content from the electronic device to a pre-specified location. For example, content of a specified type such as digital images, which has been created that day, is sent to a home server. In another example, content which is active at the electronic device in that it is currently displayed at the hover sensitive display, is sent to a pre-specified printer. In another example, the content is located at a remote entity such as a cloud server and the electronic device triggers the selected action by sending a request to the cloud server to request the content be transferred to a specified location.

In an example, in order to transfer content to the electronic device 100 the user makes a hover interaction such as that indicated in the scenario of FIG. 3 in the case that the user's hand 300 moves along the z axis towards and away from the electronic device 100. For example, the selected action is to retrieve content from a specified location such as a cloud server, home server, paired computing device or other entity. The electronic device triggers the selected action by sending a request message to the specified location to request the content.

In an example, the user makes a hover interaction as indicated in FIG. 1 to copy a photograph from the smart phone "into his or her hand". In fact the triggered action stores the identity or address of the photograph in a temporary store such as a clipboard of the electronic device or a remote entity. The user is then able to operate the smart phone 100 to create an email message for example, and attach the photograph to the email message by using the scenario of FIG. 3. In this way the user is able to operate the electronic device in a simple and efficient manner despite the small form factor. In contrast, where a conventional smart phone is used the user may have to move between separate applications executing on the smart phone in order to attach the digital photograph to the email message.

In an example, the smart phones 100 of FIG. 1 and FIG. 3 are separate smart phones which are paired as a result of being registered at the same user account of a service provider, or as a result of user input. The hover pattern and orientation of the scenario of FIG. 1 is used to trigger an action of removing content from the smart phone of FIG. 1 and holding the content at an intermediary entity such as a cloud service or other entity. At a later time, the scenario of FIG. 3 enables the content to be transferred from the intermediary to the smart phone of FIG. 3.

In an example, the smart phones of FIG. 1 and FIG. 3 are separate smart phones which are not paired but which are in the same room or which are participating in the same meeting. The hover pattern and orientation of the scenario of FIG. 1 is used to trigger an action of removing content from the smart phone of FIG. 1 and holding the content at an intermediary entity such as a cloud service or other entity. At a later time, the scenario of FIG. 3 enables the content to be transferred from the intermediary to the smart phone of FIG. 3 provided that a time since the removal of the content has not exceeded a threshold and provided that a physical distance between the smart phones is within a specified range.

Figure 4:
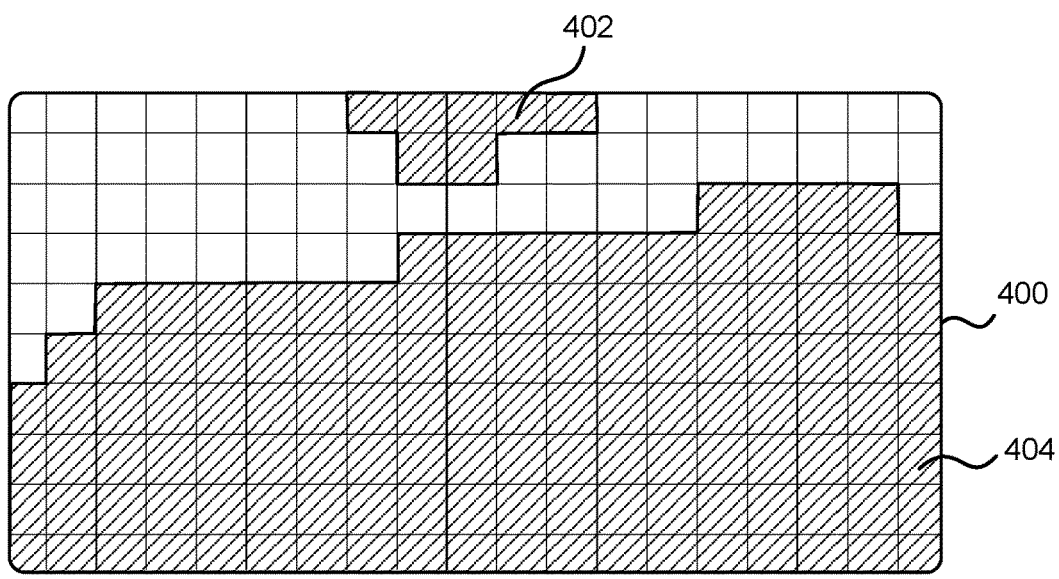
FIG. 4 is a schematic diagram of a hover pattern sensed at the hover sensitive display of the smart phone of FIG. 3.
Figure 5:
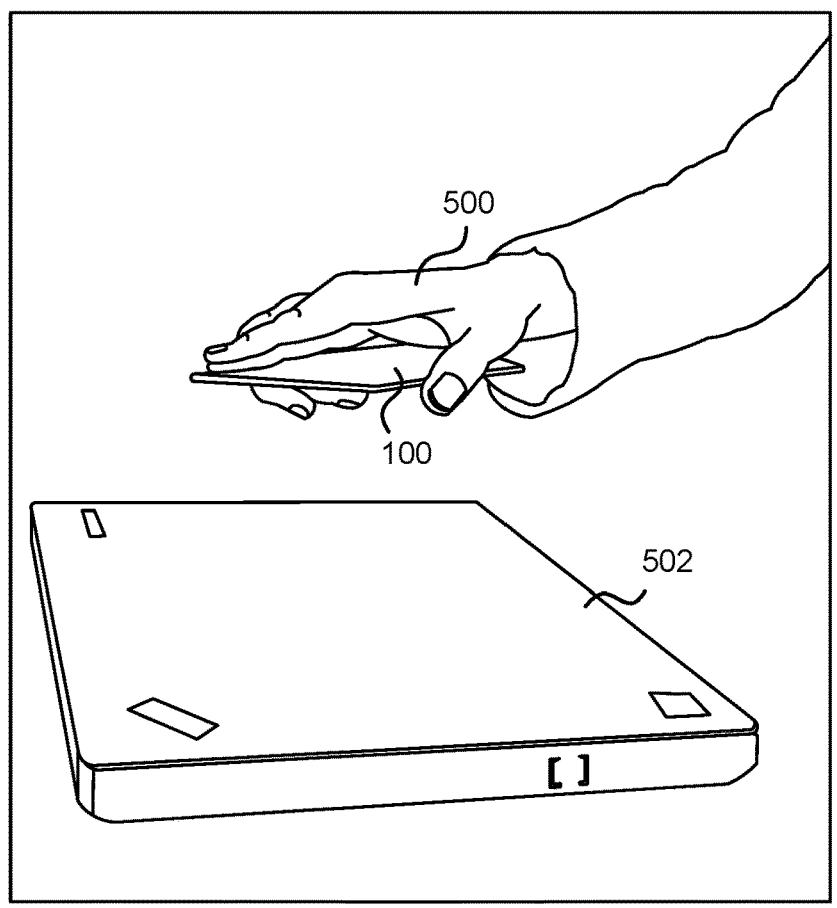
FIG. 5 is a schematic diagram of a user making a hover interaction with a laptop computer.
Figure 6:
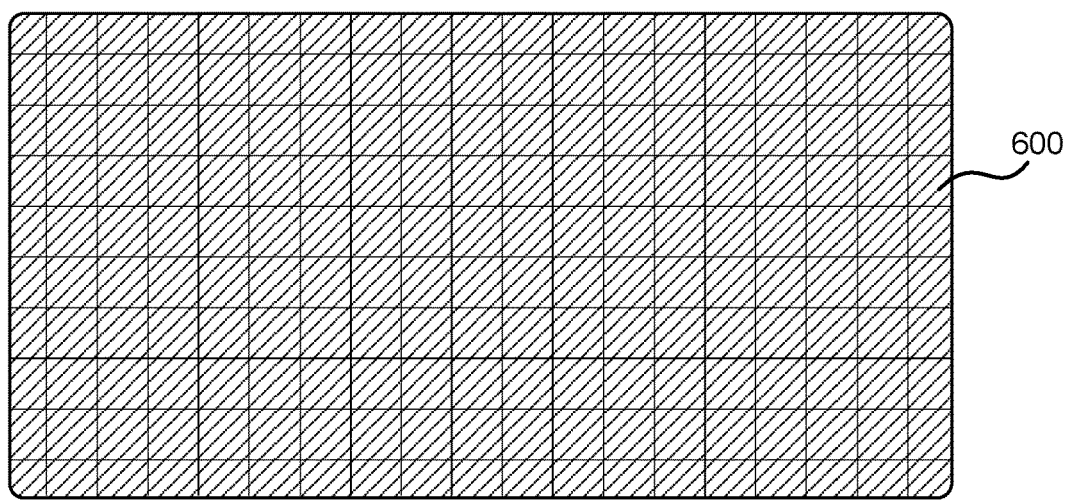
FIG. 6 is a schematic diagram of a hover pattern sensed at the hover sensitive display of the smart phone of FIG. 5.

In the example of FIG. 4 the user is holding a smart phone 100 in his or her right hand 500 in a generally horizontal, face down orientation over a laptop computer 502. In this example the hover sensor is a hover sensitive display. The resulting two dimensional hover pattern is indicated in FIG. 6 and comprises a roughly uniform signal over the grid of sensing regions. The user may move the smart phone 100 along the z axis perpendicular to the plane of the hover sensitive display, towards and away from the laptop computer 502. In that case a three dimensional hover pattern is detected, for example, as the intensity values at the sensing regions increases and decreases due to movement of the smart phone 100 towards and away from the laptop computer 600. A motion sensor at the smart phone 100 detects the motion of the smart phone 100. Optionally audio signals from the laptop computer 600 are detected by a microphone at the smart phone 100 and optionally a bar code or quick response code displayed by the laptop computer 600 is detected by a camera at the smart phone 100. The information from the microphone and or camera is used together with the other sensor data to distinguish the laptop computer from a book in some cases and/or to find an identity of the laptop.

The hover pattern is recognized and the orientation of the smart phone 100 is detected as well as the motion of the smart phone. Using that information an action is selected from a plurality of possible actions. For example, the selected action is to transfer content associated with the smart phone 100 to the laptop computer 502.

Figure 7:
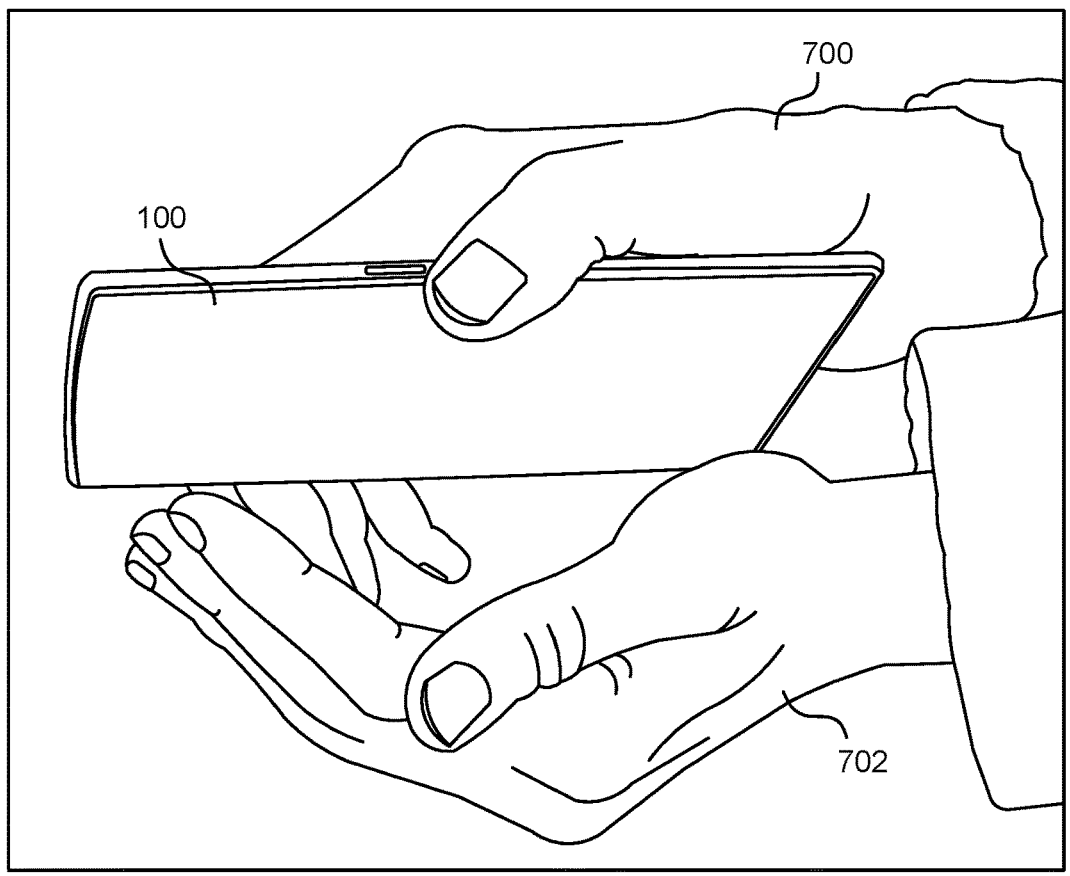
FIG. 7 is a schematic diagram of a user making a hover interaction using a cupped hand.

FIG. 7 shows an example in which the user holds a smart phone 100 in a generally horizontal, face down orientation in his or her right hand 700. The user positions his or her left hand 702 in a cup shape with the palm facing towards a hover sensitive display screen of the smart phone 100. The user shakes the smart phone 100 as if to shake content out from the smart phone 100 into the cupped hand. A motion detector in the smart phone 100 detects the shaking motion. An action is selected from a plurality of possible actions in dependence on the detected orientation, detected motion and recognized hover pattern. For example, the action is to remove content from the smart phone 100. The cupped shape of the user's left hand 702 is intuitive and simple for the user to recall since it indicates that content is to be removed from the smart phone as if it were to be shaken out of the smart phone into the cupped hand 702.

Figure 8:
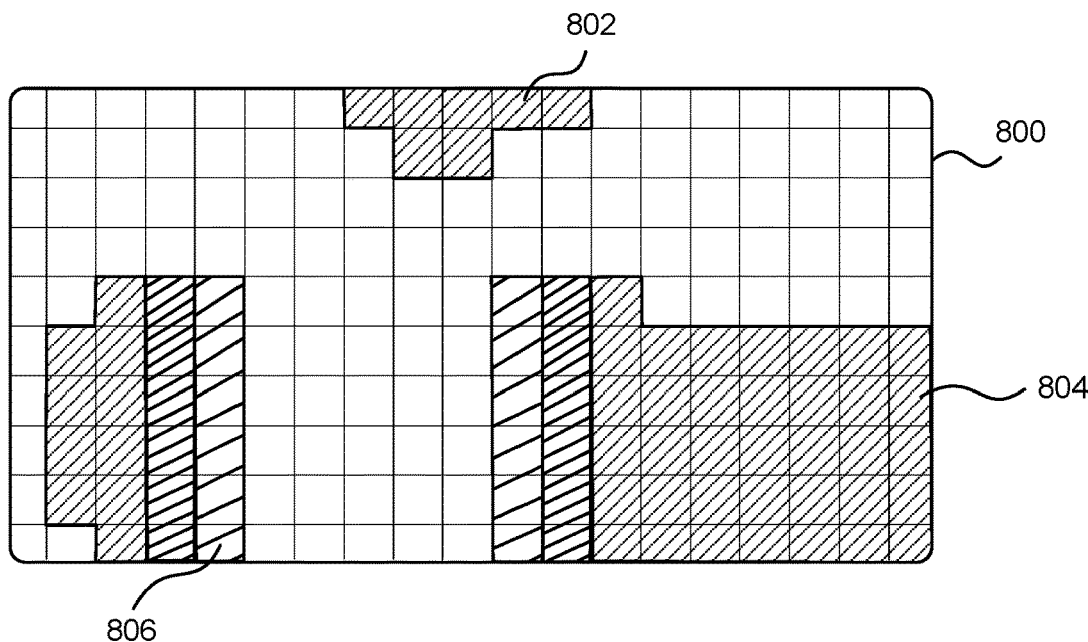
FIG. 8 is a schematic diagram of a hover pattern sensed at the hover sensitive display of the smart phone of FIG. 7.

FIG. 8 shows a two dimensional hover pattern for the scenario of FIG. 7 where the user's hands are generally static. There is a first plurality of activated sensing regions 802 representing the thumb of the user's right hand 700. There is a second plurality of activated sensing regions 804 representing the wrist and heel of the user's left hand 702. There is a third plurality 806 of activated sensing regions 806 representing the ends of the fingers of the user's left hand 702.

Figure 9:
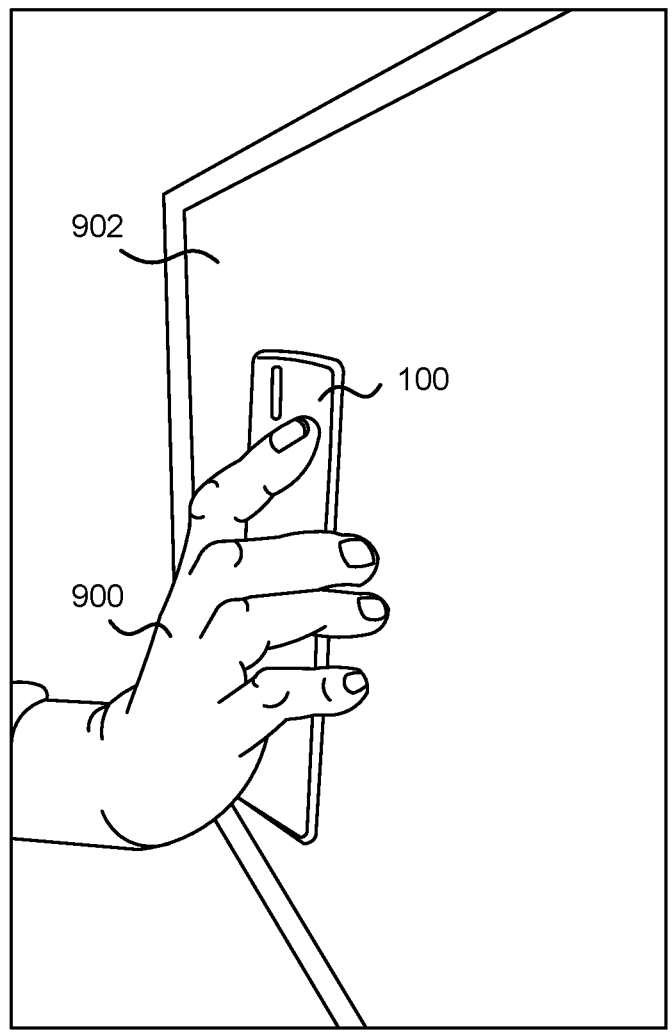
FIG. 9 is a schematic diagram of a user making a hover interaction using a smart phone in a vertical orientation against a wall mounted display screen of a computing device.

FIG. 9 is a schematic diagram of a scenario in which a user holds a smart phone 100 in a generally vertical orientation in his or her right hand 900 and where the hover sensitive display of the smart phone 100 is facing a display screen 902 of a computing device. The user is able to move the smart phone 100 along a z axis towards and away from the display screen 902 and this generates a hover pattern at the smart phone 100 and also generates a motion signal detected at a motion sensor of the smart phone 100 in some cases. An action is selected from a plurality of possible actions in dependence on orientation of the smart phone 100 and the hover pattern and, in some cases, on the detected motion. For example, the selected action is to change a volume of a loudspeaker of the display screen 902. In another example, the selected action is to "shake content onto the display screen 902" so that content from the smart phone is displayed on the larger display screen 902 in a fast and efficient manner which reduces burden on the end user.

Figure 10:
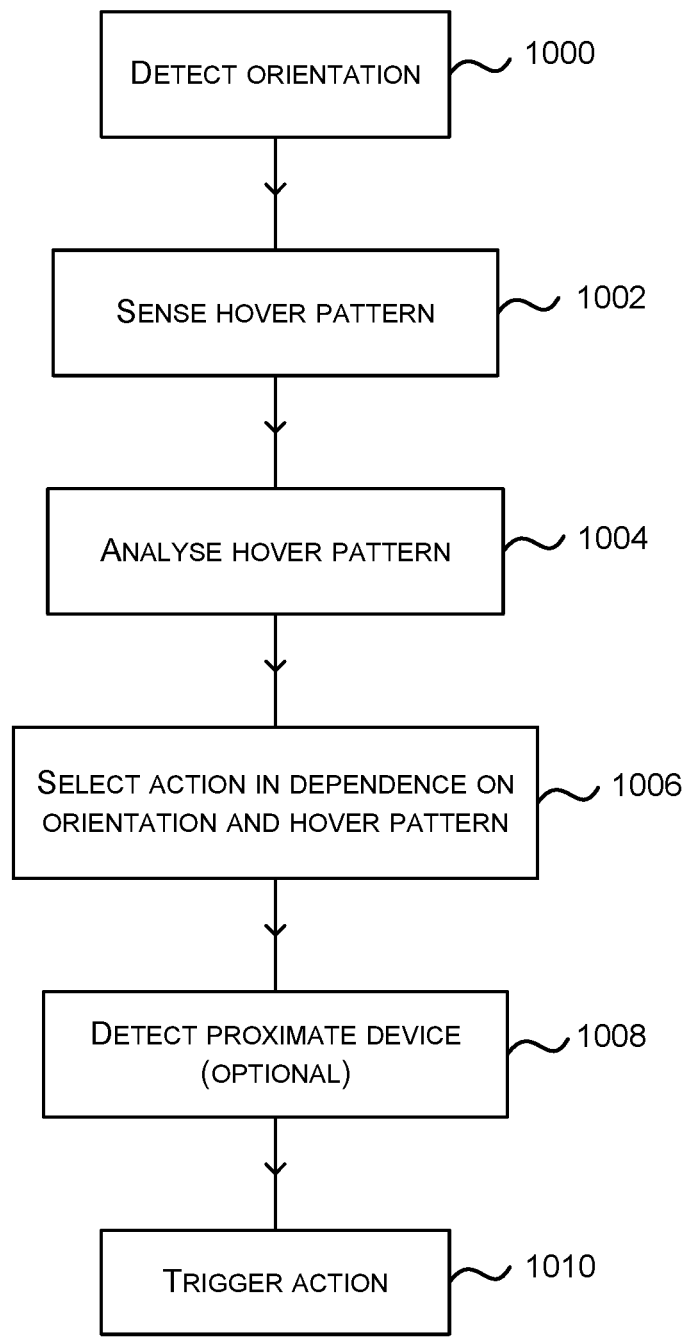
FIG. 10 is a flow diagram of a method of operation at an electronic device having a hover sensitive display.

FIG. 10 is a flow diagram of a method carried out at an electronic device such as a smart phone, wearable computer, tablet computer or other electronic device. Parts of the method of FIG. 10 may be carried out by another entity such as a remote server of a cloud service, a computing device which is paired with the electronic device, or another entity.

The electronic device detects an orientation 1000 in which it is supported. For example the orientation is sensed using one or more orientation sensors which output a measure of the orientation of the electronic device. The sensed orientation may be smoothed (to remove unintentional shake, jitter or noise) and converted to a discrete form. For example, a plurality of discrete orientations may be selected from rather than using a continuous orientation measure. The discrete orientations may be: horizontal face up, horizontal face down, vertical.

The hover sensor, such as a hover sensitive display of the electronic device senses 1002 a hover pattern such as a chronological sequence of hover patterns or an individual hover pattern. In the case of an individual hover pattern this may comprise an intensity value for each of a plurality of sensing regions of the hover sensitive display. In the case of a sequence of hover patterns there is a plurality of intensity values for each of the plurality of sensing regions, where the intensity values were detected at different times.

Functionality at the electronic device and/or at another entity analyses 1004 the hover pattern. Where another entity is used the electronic device sends the hover pattern to the other entity. A similarity of the hover pattern to each of a plurality of template hover patterns is computed using any suitable similarity metric. One of the template hover patterns is selected on the basis of the computed similarities and this selected template hover pattern is the recognized hover pattern.

A plurality of possible actions is accessed, from the electronic device or from another entity and these are possible actions that can be triggered using a hover interaction. One of the actions is selected 1006 at least in dependence on the sensed orientation and the recognized hover pattern. In various examples the action is selected 1006 using data from one or more other sensors such as motion detected by a motion sensor, sound detected by a microphone, and visual signals detected by a camera. The selected action is then triggered 1010. The triggering is done by the electronic device itself and/or by another entity such as the entity which analyzed the hover pattern.

In some cases the electronic device detects 1008 a proximate device such as a smart watch worn by the user, a laptop computer or other electronic device. The proximate device is paired with the electronic device in some cases but that is not essential. The triggered action may occur at the proximate device in some examples. In this way the electronic device is used as a remote controller of the proximate device.

In the examples described above the objects in the hover volume are fingers, thumbs and hands of a user, other computing devices or display screens. However, it is also possible for the objects in the hover volume to be three dimensional rigid physical objects such as wooden blocks of different shapes. (Wooden blocks are one example and other three dimensional objects may be used.) By placing particular ones of the three dimensional objects into the hover volume the user has a fast, simple and easily repeatable way of triggering actions. In some cases objects which have patterns of different materials such as metal and non-metal areas are used where metallic objects give a different hover pattern than non-metallic objects. Particular patterns of different materials such as metallic and non-metallic areas on the objects are chosen so as to enable robust discrimination and accurate recognition of the hover patterns. In some cases signals from other sensors such as cameras are used to detect and recognize objects in the hover volume.

FIG. 11 is a schematic diagram of an electronic device such as smart phone 100 which has a hover sensor which is a hover sensitive display 1100. In this example the smart phone is being held in a right palm of a user whose thumb and fingers are gripping the smart phone and extending above the hover sensitive display. The hover sensitive display comprises a plurality of sensing regions arranged in a grid and some but not all of the sensing regions 1102 are activated, as illustrated in FIG. 11, due to the presence of the thumb and fingers in the hover volume. Different ones of the sensing regions have different activation levels according to the distance of the thumb/fingers from the hover sensitive display.

It is also possible for the electronic device to detect specified sequences of hover patterns and to select and trigger actions based on the detected sequence of hover patterns. For example, a hover pattern which triggers a change volume action followed by a motion of the electronic device which selects a volume level.

Figure 12:
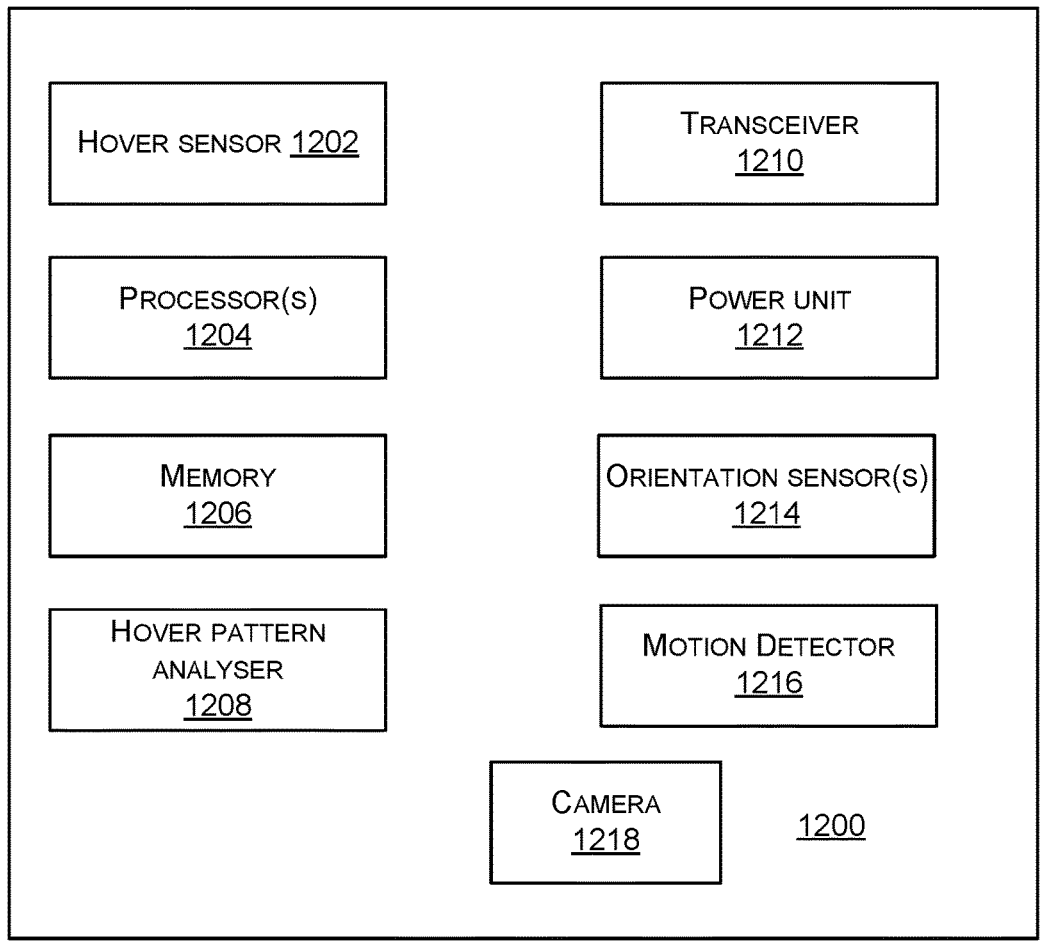
FIG. 12 illustrates an exemplary computing-based device in which embodiments of a hover interaction system using orientation is implemented.

FIG. 12 illustrates various components of an exemplary computing-based device 1200 which are implemented as any form of a computing and/or electronic device, and in which embodiments of hover interaction using orientation sensing are implemented in some examples.

Computing-based device 1200 comprises one or more processors 1204 which are microprocessors, controllers or any other suitable type of processors for processing computer executable instructions to control the operation of the device in order to detect orientation of the computing-based device, detect hover patterns and to trigger an action selected from a plurality of actions in dependence on the orientation and the hover pattern. In some examples, for example where a system on a chip architecture is used, the processors 1204 include one or more fixed function blocks (also referred to as accelerators) which implement a part of the method of detecting orientation, recognizing a hover pattern and selecting and triggering an action in hardware (rather than software or firmware).

The computer executable instructions are provided using any computer-readable media that is accessible by computing based device 1200. Computer-readable media includes, for example, computer storage media such as memory 1206 and communications media. Computer storage media, such as memory 1206, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM) including solid state persistent memory, electronic erasable programmable read only memory (EEPROM), flash memory or other memory technology, optical storage, magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1206) is shown within the computing-based device 1200 it will be appreciated that the storage is, in some examples, distributed or located remotely and accessed via a network or other communication link (e.g. using transceiver 1210 or a wired communications link).

The computing-based device 1200 also comprises a hover sensor 1202 which is a hover sensitive display in some cases arranged to output display information. The display information may provide a graphical user interface. The hover sensor 1202 is also arranged to detect hover patterns and optionally also touch input and comprises a plurality of sensing elements as described in more detail below. The computing-based device 1200 comprises a hover pattern analyser 1208 which computes a similarity metric between the hover pattern and a plurality of template hover patterns. The hover pattern analyser 1208 functionality is partly located at another entity which is in communication with the electronic device using transceiver 1210 in some examples. That is, in some cases the hover pattern analyser 1208 works by sending the hover pattern to a remote entity to be analysed and receiving the results.

The hover sensor may use sensing technologies including but not limited to: capacitive, electric field, inductive, Hall effect, Reed effect, Eddy current, magneto resistive, optical shadow, optical visual light, optical infrared, optical color recognition, ultrasonic, acoustic emission, radar, heat, sonar, conductive and resistive technologies. Combinations of one or more of these technologies may be used to implement the hover sensor.

The hover sensor is implemented using capacitive technology in some examples. In this case the hover sensor incorporates a plurality of capacitive sensing nodes each able to independently detect a capacitance change in the hover volume. The capacitance change may be caused, for example, by fingers or thumbs, a pen, a capacitive stylus, or other object in the hover volume.

In another example the hover sensor is implemented using photo-sensor technology. In this case the display incorporates a plurality of photo-sensors which detect ambient light from parts of the hover volume which are not filled by objects.

Where the hover sensor uses infrared light, the hover sensitive display or electronic device has infrared light emitters and infrared light sensors which detect reflections of the infrared light from objects in the hover volume.

The computing-based device 1200 has a power unit 1212 such as a battery unit, power cell or power unit for obtaining power from an external source. The computing-based device has one or more orientation sensors 1214 as described in detail earlier in this document. The computing-based device optionally has a motion detector 1216 and optionally has a camera 1218 or other sensors such as a microphone.

A non-exhaustive list of examples of actions which may be triggered using the technology described herein is: changing volume of a loudspeaker, muting a loudspeaker, sending content, sharing content, deleting content, downloading content, uploading content, making a video or voice call to a specified contact, to display content on a proximate display.

Alternatively or in addition to the other examples described herein, examples include any combination of the following:

An electronic device comprising:

a hover sensor;

an orientation sensor configured to detect an orientation of the electronic device; and a hover pattern analyzer configured to use data sensed by the hover sensitive display to recognize a hover pattern of one or more objects in a hover space extending from the hover sensor;

a processor configured to select an action from a plurality of possible actions in dependence on the sensed orientation and the recognized hover pattern, and to trigger the selected action.

The electronic device described above comprising one or more additional sensors and wherein the processor is configured to select the action also in dependence on data sensed by the one or more additional sensors.

The electronic device described above wherein the processor is configured to trigger the selected action by sending or receiving content associated with the electronic device.

The electronic device described above wherein the processor is configured to trigger the selected action by copying content associated with the electronic device onto a clipboard.

The electronic device described above wherein the recognized hover pattern corresponds to a cupped hand of a user.

The electronic device described above wherein the processor is configured to detect a proximate device and to trigger the selected action at the proximate device.

The electronic device described above wherein the hover pattern is a two dimensional hover pattern comprising activation levels of a plurality of sensing regions of the hover sensor.

The electronic device described above wherein the hover pattern is a three dimensional hover pattern comprising a plurality of activations levels associated with different times, for each of a plurality of sensing regions of the hover sensor.

The electronic device described above wherein the orientation sensor is configured to detect an orientation from a plurality of possible orientations being vertical, horizontal with a display screen of the electronic device face up, horizontal with a display screen of the electronic device face down.

The electronic device described above wherein the hover pattern analyser is configured to recognize the hover pattern by computing a similarity metric between the hover pattern and individual ones of a plurality of template hover patterns.

A method at an electronic device comprising:

operating a hover sensor of the electronic device;

detecting an orientation of the electronic device using at least one orientation sensor;

using data sensed by the hover sensor to recognize a hover pattern of one or more objects in a hover space extending from the hover sensor;

selecting an action from a plurality of possible actions in dependence on the sensed orientation and the recognized hover pattern action, and triggering the selected action.

The method described above comprising triggering the selected action by sending or receiving content associated with the electronic device.

The method described above comprising triggering the selected action by copying content associated with the electronic device onto a clipboard.

The method described above comprising recognizing a hover pattern corresponding to a cupped hand of a user and triggering sending content associated with the electronic device.

The method described above comprising detecting a proximate device and triggering the selected action at the proximate device.

The method described above comprising detecting an orientation from a plurality of possible orientations being vertical, horizontal with a display screen of the electronic device being face up, horizontal with a display screen of the electronic device being face down.

The method described above comprising recognizing the hover pattern by computing a similarity metric between the hover pattern and individual ones of a plurality of template hover patterns.

An electronic device comprising:

a hover sensitive display;

at least one orientation sensor configured to sense an orientation of the electronic device;

means for recognizing a hover pattern of one or more objects in a hover space extending from the hover sensitive display;

means for selecting an action from a plurality of possible actions in dependence on the sensed orientation and the recognized hover pattern action, and means for triggering the selected action.

The electronic device described above wherein the means for triggering is configured to transfer content associated with the electronic device.

The electronic device described above wherein the means for triggering is configured to copy content associated with the electronic device onto a clipboard.

The examples illustrated and described herein as well as examples not specifically described herein but within the scope of aspects of the disclosure constitute exemplary means for recognizing a hover pattern, means for selecting an action, and means for triggering an action. For example, the processor 1204 and hover pattern analyzer 1208 illustrated in FIG. 12, such as when encoded to perform the operations illustrated in FIG. 10, constitute exemplary means for recognizing a hover pattern, means for selecting an action and means for triggering an action.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A method at an electronic device comprising:
operating a hover sensor of the electronic device, the electronic device having a display screen;
detecting an orientation of the electronic device using at least one orientation sensor, the orientation being the display screen face down;
using data sensed by the hover sensor to recognize a hover pattern of one or more objects in a hover space extending from the hover sensor and at a distance from the display screen;
operating one or more additional sensors;
detecting a type of the one or more objects using the one or more additional sensors, the type being a physical object type to allow distinguishing between different physical objects;
selecting an action from a plurality of possible actions in dependence on the sensed orientation of the display screen being face down, the recognized hover pattern, and the detected type of the one or more objects based on different sensor data from the one or more additional sensors; and
triggering the selected action.

2. The method of claim 1 comprising triggering the selected action by sending or receiving content associated with the electronic device.

3. The method of claim 1 comprising triggering the selected action by copying content associated with the electronic device onto a clipboard.

4. The method of claim 1 comprising recognizing a hover pattern corresponding to a cupped hand of a user and triggering sending content associated with the electronic device.

5. The method of claim 1 comprising detecting a proximate device and triggering the selected action at the proximate device.

6. The method of claim 1 comprising detecting a plurality of possible orientations including vertical, horizontal with a display screen of the electronic device being face up, horizontal with a display screen of the electronic device being face down.

7. The method of claim 1 comprising recognizing the hover pattern by computing a similarity metric between the hover pattern and individual ones of a plurality of template hover patterns, wherein the one or more additional sensors are configured to detect the type of the one or more objects as an electronic object type or a non-electronic object type.

8. An electronic device comprising:
a display screen;
a hover sensor;
an orientation sensor configured to detect an orientation of the electronic device, the orientation being the display screen face down;
a processor configured to acts as a hover pattern analyser that uses data sensed by the hover sensor to recognize a hover pattern of one or more objects in a hover space extending from the hover sensor and at a distance from the display screen;
one or more additional sensors configured to detect a type of the one or more objects, the type being a physical object type to allow distinguishing between different physical objects; and
the processor further configured to select an action from a plurality of possible actions in dependence on the sensed orientation of the display screen being face down, the recognized hover pattern, and the type of the one or more objects based on different sensor data from the one or more additional sensors, and to trigger the selected action.

9. The electronic device of claim 8 wherein the one or more additional sensors comprise a microphone configured to receive a sound from the one or more objects to detect the type of the one or more objects.

10. The electronic device of claim 8 wherein the processor is configured to trigger the selected action by sending or receiving content associated with the electronic device, and wherein a different action is selected based on a different detected type of the one or more objects in a same sensed orientation of the electronic device and a same recognized hover pattern.

11. The electronic device of claim 8 wherein the processor is configured to trigger the selected action by copying content associated with the electronic device onto a clipboard.

12. The electronic device of claim 8 wherein the recognized hover pattern corresponds to a cupped hand of a user.

13. The electronic device of claim 8 wherein the processor is configured to detect a proximate device and to trigger the selected action at the proximate device.

14. The electronic device of claim 8 wherein the hover pattern is one of (i) a two dimensional hover pattern comprising activation levels of a plurality of sensing regions of the hover sensor or (ii) a three dimensional hover pattern comprising a plurality of activations levels associated with different times, for each of a plurality of sensing regions of the hover sensor, the types of objects include physical objects having a same general shape and size, and the different sensor data comprises image data and sound data.

15. The electronic device of claim 8 wherein the one or more additional sensors comprise a camera configured to image one of a bar code or a quick response code of the one or more objects to detect the type of the one or more objects.

16. The electronic device of claim 8 wherein the orientation sensor is configured to detect a plurality of possible orientations including vertical, horizontal with a display screen of the electronic device face up, horizontal with a display screen of the electronic device face down.

17. The electronic device of claim 8 wherein the hover pattern analyser is configured to recognize the hover pattern by computing a similarity metric between the hover pattern and individual ones of a plurality of template hover patterns and to use data sensed by the hover sensor to recognize different hover patterns of the one or more objects to identify metallic and non-metallic areas on the one or more objects.

18. An electronic device comprising:
a display screen;
a hover sensitive display;
at least one orientation sensor configured to sense an orientation of the electronic device the orientation being the screen face down;
means for recognizing a hover pattern of one or more objects in a hover space extending from the hover sensitive display and at a distance from the display screen;
one or more additional sensors configured to detect a type of the one or more objects, the type being a physical object type to allow distinguishing between different physical objects;
means for selecting an action from a plurality of possible actions in dependence on the sensed orientation of the display screen being face down, the recognized hover pattern action, and the detected type of the one or more objects based on different sensor data from the one or more additional sensors; and
means for triggering the selected action.

19. The electronic device of claim 18 wherein the means for triggering is configured to transfer content associated with the electronic device.

20. The electronic device of claim 18 wherein the means for triggering is configured to copy content associated with the electronic device onto a clipboard.

* * * * *